United States Patent [19]

Zender

[11] 4,145,648
[45] Mar. 20, 1979

[54] POLARITY INDICATOR FOR BATTERY CHARGER

[75] Inventor: James P. Zender, Sumter, S.C.

[73] Assignee: ESB Incorporated, Philadelphia, Pa.

[21] Appl. No.: 809,979

[22] Filed: Jun. 27, 1977

[51] Int. Cl.² .................. H02J 7/00; H01R 11/00
[52] U.S. Cl. ........................... 320/25; 320/48;
                                      339/29 B; 340/636
[58] Field of Search ........... 320/2, 25, 48; 307/311;
                                323/21; 340/636; 339/29 B

[56] References Cited

U.S. PATENT DOCUMENTS

| | | | |
|---|---|---|---|
| 3,258,672 | 6/1966 | Godshalk et al. | 307/311 |
| 3,259,754 | 7/1966 | Matheson | 307/311 |
| 3,267,452 | 8/1966 | Wolf | 307/311 |
| 3,308,365 | 3/1967 | St. John | 320/25 |
| 3,387,200 | 6/1968 | Godshalk | 307/311 |
| 3,749,905 | 7/1973 | Friedman et al. | 320/25 X |
| 3,869,641 | 3/1975 | Goldberg | 307/311 |
| 3,936,121 | 2/1976 | Leinberger | 307/311 |
| 3,939,421 | 2/1976 | Barringer et al. | 320/48 X |
| 3,947,753 | 3/1976 | Gushima et al. | 323/21 |
| 3,967,257 | 6/1976 | Hager | 307/311 X |

Primary Examiner—Robert J. Hickey
Attorney, Agent, or Firm—Gary V. Pack; Anthony J. Rossi; Gilbert W. Rudman

[57] ABSTRACT

A polarity indicating system using a light emitting diode is mounted on the clip for a battery charger to provide an indication that the battery charger is properly connected to the battery being charged. In the preferred embodiment, the LED is connected to a test probe mounted in one of the handles of the negative clip and connected in series between the test probe and the positive cable. An alternate embodiment uses the polarity indicating system on battery booster cables.

8 Claims, 3 Drawing Figures

POLARITY INDICATOR FOR BATTERY CHARGER

BACKGROUND OF THE INVENTION

This invention is related to polarity indicators for battery chargers and booster cables.

The possibility of connecting battery charger cables or battery booster cables to a battery in reverse polarity is one problem that must always be guarded against. In the case of battery chargers, an improper connection can result in substantial damage being done to the battery as well as the possibility that the battery is permanently destroyed due to excessive discharge. As power is supplied to the improperly connected battery, arcing can occur between the battery terminals, thereby creating a significant risk of igniting the acid fumes around the battery vents and exploding the battery. Furthermore, since the improperly connected battery is a much greater impedance load on the charging system than one properly connected, the charger produces excessive current levels, which also increases the risk of acring between terminals as well as internal ignition of the electrolyte due to the heat created.

In the event battery booster cables are connected improperly, not only can the battery itself be damaged as discussed above but also electrical components of the vehicle can be ruined, such as the alternator diodes.

A polarity indicator system is therefore required to provide some form of indication that the particular clips for the cables of the battery charger, or for the battery jumper cables, are connected to the battery in the proper manner. Such a system should be designed so that in the event the polarity test connections are made improperly, no damage to the battery takes place while the polarity indicator is connected. Furthermore, when the polarity indicator is properly connected for a test, current requirements for indicating a proper connection should be small enough not to further drain the little remaining battery energy. Another requirement is that no sparks be created when connecting the polarity indicator to the battery terminal, whether these connections are correct polarity wise or not.

SUMMARY OF THE INVENTION

In accordance with a preferred embodiment, a polarity indicator is provided for use in conjunction with a battery charger. The polarity indicator includes a test probe mounted on one handle of the negative clip. A light emitting diode is connected between the test probe and the positive clip in such a manner that it is forward biased when the positive clip and the test probe are appropriately connected to the positive and negative terminals of a battery, respectively, thereby illuminating to indicate that the positive clip is properly connected and the negative clip can be connected to the other terminal. Preferably, the light emitting diode is mounted in conjunction with the test probe at the end of one of the handles of the negative clip so that an immediate indication is provided to the charger operator when he contacts the test probe to the battery terminal. A resistance placed in series with the light emitting diode acts to prevent excessive current flow which may cause damage to the light emitting diode or excessive drain of the battery.

An alternate embodiment of the polarity indicator system is provided wherein a battery booster cable pair has one cable set modified in a manner similar to that discussed above for the battery charger. The test probe is mounted in the clip handle of one of the battery booster cable sets. The LED is mounted in conjunction with the test probe and connected between the test probe and the clip itself or the cable conductor connected to that clip. The modified booster cable set can then be used in accordance with a similar procedure to indicate the negative and positive terminals.

This invention provides a quick, safe system for determining that a battery charger or battery booster cables are properly connected. The light emitting diode minimizes the possibility of further draining the battery by the polarity test since current flow in a reverse direction is not permitted and forward current flow is limited to that required to light the LED. The LED also minimizes the possibility of sparks being produced during the test operation. Furthermore, mounting of the light emitting diode in conjunction with the test probe provides the operator an immediate indication that the clips are properly connected, thereby eliminating the need of the operator to hold the probe at one location and monitor a signal indicator at a different location.

A better understanding of the invention and its advantages can be seen in the following description of the figures and the preferred embodiments.

DESCRIPTION OF THE DRAWINGS & THE PREFERRED EMBODIMENTS

Figure 1:
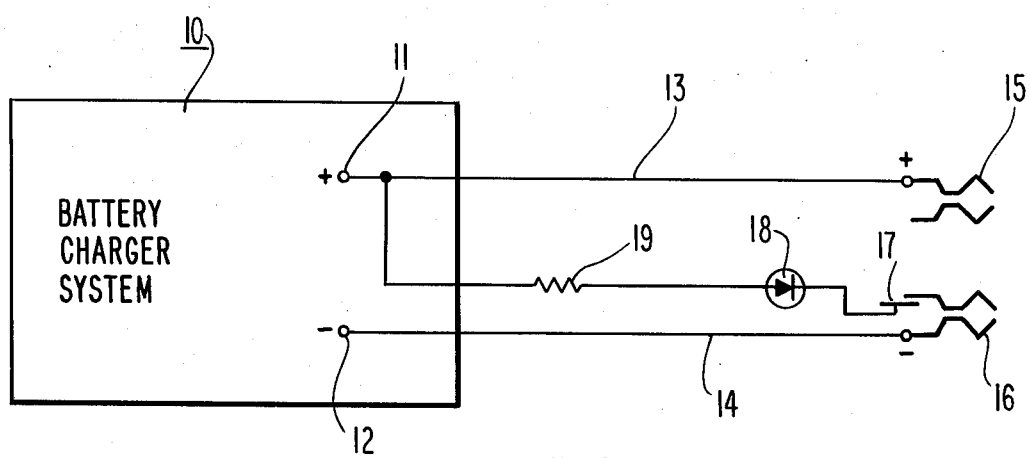
FIG. 1 is a schematic view illustrating the electrical connections of the various elements of the polarity indicator interconnected with a battery charger.

Referring to FIG. 1, a battery charger system 10 has positive and negative output terminals 11 and 12 which are connected to charger conductor leads 13 and 14, which terminate in positive and negative battery clips 15 and 16, respectively. The polarity indicator system for the battery charger has a test probe 17 located at negative clip 16. A light emitting diode 18 is connected between positive lead 13 and test probe 17 in a direction so that the diode will be forward biased when the potential on positive lead 13 is greater than that on the test probe 17. A resistor 19 may be placed in series with light emitting diode 18 to restrict the flow of current through the diode.

Figure 2:
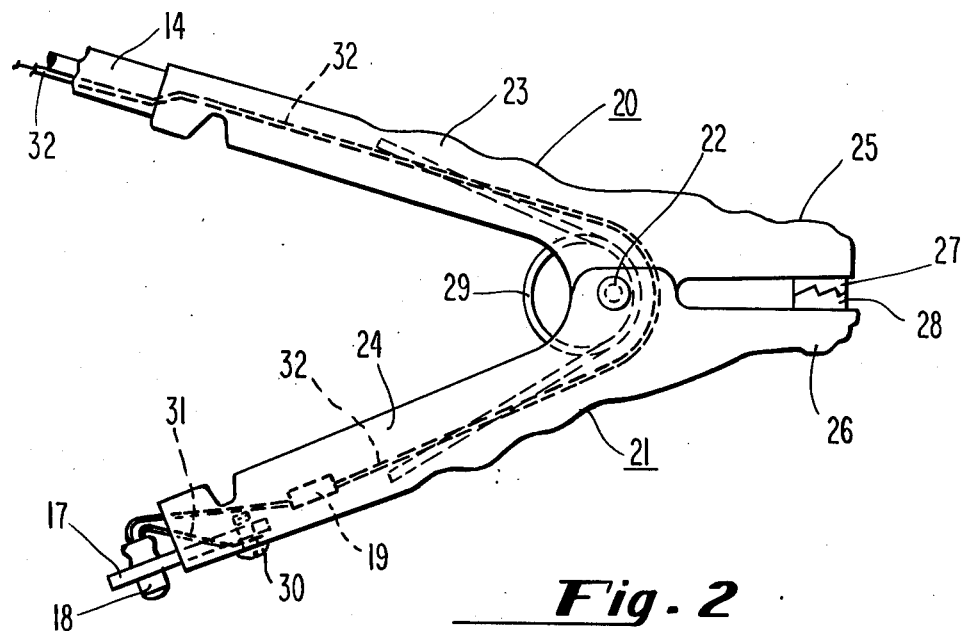
FIG. 2 is an illustration of a typical clip having the test probe and light emitting diode.

Referring to FIG. 2, an example is provided showing one installation design for test probe 17 and LED 18 on a typical clip. Negative clip 16 consists of two members 20 and 21, pivoted about pin 22. Each member has a handle 23 and 24 and opposing jaws 25 and 26 with gripping teeth 27 and 28, respectively. A coil spring 29 biases members 20 and 21 about pin 22 so that teeth 27 and 28 are biased toward each other. Negative lead 14 is received by handle 23 and secured into place by squeezing extensions at the end of handle 23 around the insulation of lead 14. The conductor of negative lead 14 is connected to jaw teeth 27 by means not shown.

Test probe 17 is connected to the end of member 21 by fastener 30. Test probe 17 extends a predetermined distance from the end of handle 24 and is insulated from said member. Insulation may be provided by a vinyl or plastic coating of clip members 20 and 21, or by many other suitable means available in the art. Light emitting diode 18 is secured through an opening in test probe 17 at a point outside of member 21 so that it is readily visible to the user. The negative terminal of LED 18 is connected to test probe 17 by lead 31. The positive terminal of LED 18 is connected to positive battery cable lead 13 through resistor 19 and lead 32. Preferably, lead 32 is an insulated wire small in size compared to battery charger lead 14, and passes through the internal structure of members 20 and 21 (as shown in phantom in FIG. 2) and internally through cable 14 to charger system 10 where it is connected to positive cable 13.

When using the polarity indicator for the battery charger, the operator first takes the positive clip 15 and connects it to what he believes to be the positive terminal of the battery to be charged. The operator then takes negative clip 16 and holds it in a vertical position with the handle member 24 having the light emitting diode and test probe facing downward and toward him. Test probe 17 is then placed into contact with what is believed to be the negative terminal of the battery to be charged. If the positive terminal is connected to positive clip 15, enough current should be left in the battery to cause the potential of positive clip 15 to be above that in test probe 17. This potential creates a sufficient forward current through light emitting diode 18 to illuminate it. Illumination of diode 18 indicates that clip 15 is properly connected to the postive battery terminal and that negative clip 16 can be connected to the remaining terminal. Then the charging operation can proceed.

Should the light emitting diode 18 not light up, the operator can assume that he has either reversed his clip connections on the battery or that a fault exists somewhere in the polarity indicator circuit or the battery. After reversing the connections of clips 15 and 16, if light emitting diode 18 still fails to light up, the polarity indicator system should be test by connecting it to a battery which is known to be fully charged. Failure to light after this test indicates that the components of the polarity indicator system should be checked out. In the event the polarity indicator system passes this test, it can be concluded that the original battery to be charged was drained below an amount sufficient to produce enough current to light the light emitting diode, and probably could not be charged anyway.

Figure 3:
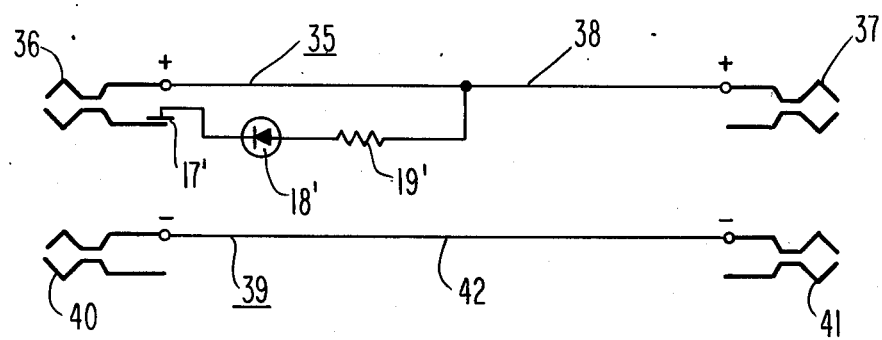
FIG. 3 is a schematic view of a pair of battery booster cables with one set of cables having the polarity indicator of the invention.

The polarity indicating system for the battery charger can also be used on battery booster cables. A battery cable set modified in this fashion is illustrated in FIG. 3. The battery cables include a positive booster cable set 35 with a positive conductor 38 connecting first and second clips 36 and 37, and a negative booster cable 39 with a negative conductor 42 connecting first and second negative clips 40 and 41. The polarity indicator system is shown installed on the positive booster cable set 35, and includes test probe 17' located on second positive jumper cable clip 36, light emitting diode 18' and current limiting resistor 19' all connected between test probe 17' and positive conductor 38.

While the drawing provided in FIG. 3 is merely schematic in form, it can be appreciated that clip 36 can be constructed in a manner similar to that illustrated in FIG. 2, with the exception that resistor 43 would be connected directly to conductor 38 at the point that it is mounted in clip 36.

When using the pair of battery booster cables, the polarity indicator on positive cable set 35 can be used to determine the positive and negative terminals of both the battery to be recharged and the good battery. Clip 37 of cable set 35 is connected to the terminal of the selected battery which the operator believes to be the positive terminal. The operator then takes clip 36 and rotates it so that test probe 17' and light emitting diode 18' are in view. Test probe 17' is then placed against the other terminal of the battery to be tested. If light emitting diode 18' lights up, an indication is thereby provided that the originally selected terminal of the battery is the positive terminal. The same test can be performed on the other battery. After identifying the polarities of the various terminals, the battery cables can be properly connected between the two batteries.

It should be noted that the embodiments of the polarity indicator system disclosed above may be easily altered in many ways to accomplish equivalent results. One such alternative is to have the test probe located on the clip of opposite polarity and the light emitting diode connected in a reverse direction.

While particular embodiments of this invention have been shown and described, it is obvious that changes and modifications can be made without departing from the true spirit and scope of the invention. It is the intention in the appended claims to cover all such changes and modifications.

I claim:

1. In a battery charger having positive and negative output terminals, with positive and negative battery charger cables and clips connected thereto, for connection of the charger to the positive and negative terminals of the battery to be charged, a polarity indicator for indicating to the operator of the battery charger the correct terminals of the battery to be charged, said polarity indicator comprising:
    (a) test probe means mounted in conjunction with the second charger clip such that said test probe is electrically insulated from said second charger clip; and
    (b) light emitting diode means connected between a first charger clip and the test probe means, so that upon connection of the first charger clip to a first battery terminal and contact of the test probe means with the other battery terminal, the polarity of the terminals is indicated by whether or not said light emitting diode lights up.

2. The system recited in claim 1, wherein the light emitting diode is mounted in conjunction with the test probe in the second battery clip, so that the operator of the battery charger may easily view the light emitting diode.

3. The system recited in claim 2, wherein the first charger clip is the positive charger clip, and the light emitting diode is connected between the positive charger clip and the test probe such that it will be forward biased and will light up when the positive clip is connected to the positive battery terminal and the test probe is contacted to the negative battery terminal.

4. The system recited in claim 3, further comprising means in series with the light emitting diode, for controlling the current flow through the light emitting diode.

5. In a battery booster cable pair having positive and negative booster cable sets with positive and negative clips attached to each end of the conductors for the positive and negative cables, respectively, a polarity indicator for determining the polarity of the terminals of the batteries to be connected, said polarity indicator comprising:
    (a) test probe means mounted in conjunction with the second charger clip such that said test probe is electrically insulated from said second charger clip; and (b) light emitting diode means connected between the test probe and a first booster conductor, so that upon connection of a first clip of said first conductor to a selected first terminal of a battery and contact of the test probe to the other terminal of the battery, an indication of the polarity between the two battery terminals is provided by whether or not said light emitting diode lights up.

6. The apparatus recited in claim 5, wherein the light emitting diode is mounted in conjunction with the test probe so that it may be easily seen by the user.

7. The apparatus recited in claim 6, further comprising means for restricting the flow of current through the light emitting diode.

8. The apparatus recited in claim 7, wherein the light emitting diode is connected between the first clip and the test probe such that it will be forward biased and will light up when the first clip is connected to the positive battery terminal and the test probe is contacted to the negative battery terminal.

* * * * *